Oct. 17, 1961 — E. KNIEPKAMP — 3,004,807

SEAL

Filed Sept. 10, 1957

INVENTOR:
Ernst Kniepkamp
By Clelle W. Upchurch
ATTORNEY

United States Patent Office 3,004,807
Patented Oct. 17, 1961

3,004,807
SEAL
Ernst Kniepkamp, Heilbronn, Germany, assignor, by mesne assignments, to Mobay Chemical Company, Pittsburgh, Pa., a corporation of Delaware
Filed Sept. 10, 1957, Ser. No. 683,136
Claims priority, application Germany Sept. 18, 1956
8 Claims. (Cl. 308—187.1)

This invention relates generally to bearing seals and more particularly to an axial seal for a ball bearing.

It has been proposed heretofore to provide an axial seal for shaft bearings of such construction that the ring-shaped sealing surfaces are pressed together by means of springs. Such seals are commonly used to protect the bearing against small particles of dust, other solid foreign material or liquids. One serious disadvantage of the heretofore available axial seals is that they require a relatively large space because the spring elements and the sealing rings are relatively large. The increase in dimensions in the axial direction results in a longer lever arm from the supporting bearing which necessitates a larger shaft and thus an increase in cost of seal and shaft.

It is, therefore, an object of this invention to provide an improved axial bearing seal. Another object of the invention is to provide a relatively small axial seal for sealing off the bearing around a rotating shaft. A further object of the invention is to provide a novel combination of ball bearing and bearing seal. A still further object of the invention is to provide a novel combination of bearing, shaft and bearing seal. Other objects will become apparent from the following description with reference to the accompanying drawing in which.

The foregoing objects and others are accomplished in accordance with this invention, generally speaking, by providing a bearing and seal arrangement wherein a combination of a sealing ring pressed against one of the races of a ball bearing and a compressed resilient ring provide a seal which prevents particles of dust or other foreign solid or liquid material from coming in contact with the bearing about a rotating shaft. More specifically, the invention contemplates a bearing seal about a shaft in which a ball bearing having an inner and outer bearing race positioned in a housing is sealed by means of a sealing ring and a retainer ring exerting an axial force against the inner and outer races, respectively. The bearing seal has a resilient ring compressed between the sealing ring and retainer ring.

The sealing surface may be between a sealing ring and either the inner race or outer race of the bearing. In one embodiment of the invention, the sealing ring lies about the shaft and has a surface at one end which is pressed in sealing relationship against the end surface of the inner race of the bearing. A retainer ring extends around the inner wall of the housing and rests on a snap ring or other means mounted on the housing wall. This retaining ring presses against the outer race of the bearing. Both the sealing ring and the retaining ring have tapered surfaces which face each other and a resilient ring is pressed between and deformed by these tapered surfaces thereby insuring a seal which will not permit dirt or other foreign particles to reach the bearing. The surface of the sealing ring lying against the inner bearing race forms a mechanical seal which prevents liquids or solid foreign materials from entering about the shaft and into the bearing. In this embodiment, the sealing ring fits loosely about the shaft and does not turn with it. The retaining ring is locked with the sealing ring and is stationary. The retaining ring fits tightly against the inner wall of the housing so no foreign material can migrate therebetween and into the bearing.

In another embodiment of the invention, the retaining ring lies adjacent the shaft and turns therewith. The sealing ring fits tightly against the housing and presses against the outer race of the bearing. In this embodiment, the sealing ring and the retainer ring each have a tapered surface and a resilient ring is compressed between the tapered surfaces to form a seal. In this embodiment, the retaining ring and the sealing ring turn with the shaft and the sealing ring forms a mechanical seal with the stationary outer bearing race.

Figure 1:
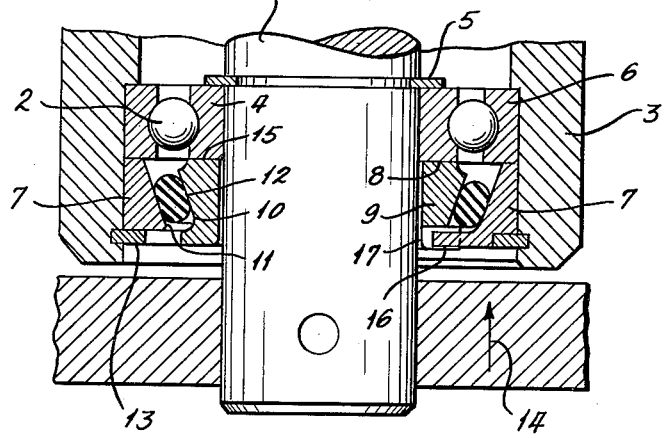
FIGURE 1 is a longitudinal sectional view of a bearing and seal assembly around a rotatable shaft.

Referring now to the drawing, one embodiment is illustrated in FIGURE 1 in which a shaft 1 is surrounded by a ball bearing 2 secured in position in bearing housing 3. Ball bearing 2 has inner race 4 lying adjacent shaft 1 and outer race 6 lying against the inner wall of housing 3. In this particular embodiment, the bore of housing 3 above bearing 2 is less than that about the bearing thereby providing a shoulder on the wall of housing 3 for outer race 6 of bearing 2 to rest against. Shaft 1 has an annular groove therein and a metal ring 5 fits into this groove. A Seegar ring or any other type of ring adapted to snap into the annular groove in shaft 1 may be used as ring 5. Such rings are split and of less diameter than the diameter of the shaft so that they fit tightly in the groove. Inner race 4 rests against ring 5.

Bearing 2 is pressed against races 4 and 6 by means of sealing ring 9 and bearing retaining ring 7, respectively. Sealing ring 9 has a surface substantially parallel with the surface of shaft 1 and an opposite tapered surface 10 facing retaining ring 7. Retaining ring 7 also has a tapered inner surface 11 facing the tapered surface 10 of ring 9 and a surface substantially perpendicular to its base adjacent the inner wall of housing 3. A seal is formed between surface 8 of bearing race 4 and surface 15 of ring 9, the two surfaces being ground to fit in sealing relationship with each other.

An elastic ring 12 of rubber-like material and preferably of a rubber-like polyurethane plastic having a Shore A hardness of about 60 to 90 and an elasticity of about 35 to 55% is compressed between the tapered surfaces 10 and 11. Preferably, ring 12 has a substantially round cross-section in the uncompressed state as shown in FIGURE 2 and it is larger in cross-section than the space between the tapered surfaces in order that it is compressed into an out-of-round or oval shape when the parts of the bearing seal are assembled in housing 3.

Figure 2:
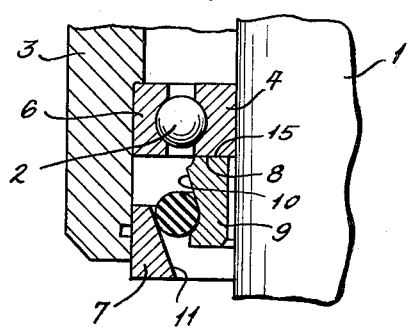
FIGURE 2 is a fragmentary longitudinal sectional view of the embodiment of FIGURE 1 in a partially assembled position.

As shown in FIGURE 2, in assembling the various parts bearing 2 is positioned in housing 3 against the shoulder on the inner wall thereof and against snap ring 5. Sealing ring 9 is positioned around shaft 1 with surface 15 facing surface 8 of bearing race 4. Ring 12 may be placed about ring 9 and frusto-right-triangularly shaped ring 7 is positioned against the inner wall of housing 3. Ring 7 is pushed inwardly in the housing until it strikes race 6, thereby compressing and deforming ring 12 which exerts a force against ring 9 in the direction indicated by arrow 14. A friction lock between rings 7, 12 and 9 is obtained. Ring 7 is held in position by snap ring 13 lying in a groove in the inner wall of housing 3. Matching surfaces 8 and 15 are constantly pressed together forming a mechanical seal.

Figure 3:
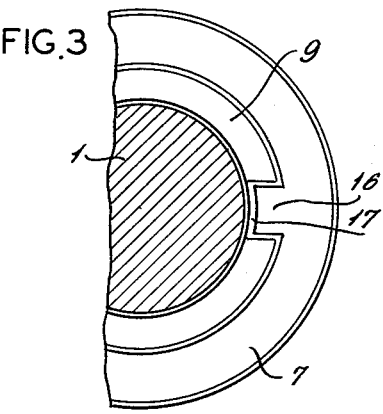
FIGURE 3 is a fragmentary cross-section of the embodiment of FIGURE 1 showing the right-hand portion of the bearing and seal assembly of FIGURE 1.

As shown in FIGURES 1 and 3, ring 7 may be provided with at least one projection or catch 16 which fits into a meshing notch or slot 17 in ring 9, thereby locking the two rings together and preventing rotation of ring 9. Three evenly spaced catches 16 may be provided advantageously at 120° intervals or a greater or lesser number may be provided, if desired.

Bearing 2 by means of bearing race 4 fits snugly against shaft 1 and turns therewith while ring 9 is stationary and exerts an axial force against surface 8 of bearing race 4 forming a mechanical seal with surface 15. Retaining ring 7, resilient ring 12 and sealing ring 9 are stationary. Snap ring 13 may have a round cross-section, if desired.

Figure 4:
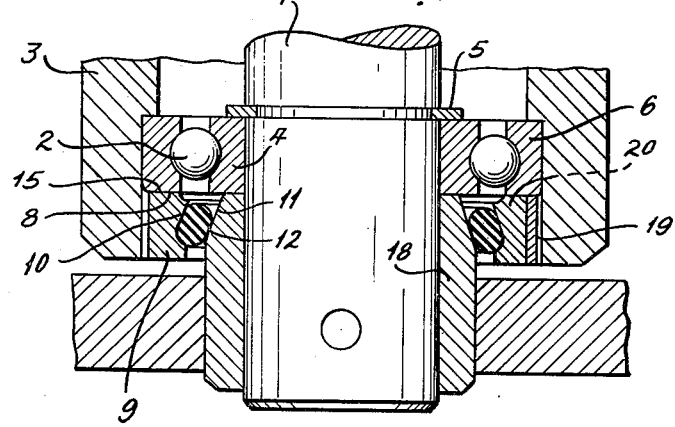
FIGURE 4 is a fragmentary longitudinal section of another embodiment of the invention.

The embodiment of FIGURE 4 is similar to that of FIGURE 1 with the exception that sealing ring 9, the resilient ring 12 and tapered surface 11 of bushing 18 are the rotating parts. Bushing 18 is secured against axial movement but rotates with the shaft and is a retainer ring for bearing 2. A mechanical seal is formed between rotating surface 15 of rotating ring 9 and surface 8 of outer race 6. Metal casing 19 encloses sealing ring 9 to reinforce it and seal it against particles of dirt and other foreign materials. Dotted line 20 indicates that an intermediate sealing disk may be inserted between outer race 6 and ring 9, if desired, to provide a seal. In this way, a relatively thin disk may be used where a particularly desirable but costly metal or other material is desired or required for effecting a seal with surface 8 of the bearing race.

The resilient annular ring 12 may be made from any suitable resilient rubber-like material, such as, for example, rubber, synthetic rubber or any resilient plastic. Preferably, however, the annular resilient ring 12 is made from a rubber-like polyurethane plastic. The rubber-like polyurethane plastic may be prepared by any suitable method, such as, for example, that disclosed in U.S. Patent 2,729,618. The resilient ring may be formed, for example, by casting a polyurethane plastic by the process disclosed in this patent or it may be formed by one of the processes disclosed in U.S. Patent 2,621,166, U.S. Patent 2,620,516 or U.S. Patent 2,778,810. In order to function satisfactorily, the resulting polyurethane ring should have a Shore A hardness of about 60 to about 90 and a resiliency of about 35 to about 55%. The polyurethane plastic used for molding the ring may be prepared from a polyester, polyalkylene ether glycol, polythioether glycol, polyesteramide or any other organic compound having at least two reactive hydrogen atoms capable of reacting with an organic polyisocyanate and preferably having a molecular weight of at least 500 and an hydroxyl number of not more than 224. Any suitable organic polyisocyanate and any suitable cross-linker including the polyisocyanates and cross-linkers disclosed in the aforesaid patents may be used. By providing an annular resilient ring, the parts do not require accurate machining in order to provide a seal therebetween since the elasticity of the ring will compensate for any inaccuracies on the surfaces. The ring 12 is larger in cross-section than the space between the tapered surfaces of the sealing ring and retaining ring in order that it is compressed therebetween.

In order to facilitate assembly of the various parts making up the seal, it is advisable to design the annular ring 12 as a complete ring having a circular cross-section. Such a ring will become locked in place between the tapered surfaces by friction. The circular cross-section is preferred because the ring can then be rolled in place. It will assume an oval cross-section upon compression. It is, of course, possible to use an annular ring 12 having a shape other than circular cross-section, such as, for example, it may be a bulge on the tapered surface of retaining ring 7.

It is preferred to design the surfaces in contact with the ring 12 in such a way that they taper and increase in diameter in the direction towards the bearing if the bearing race is stationary. If the bearing rotates, the design should be such that the surfaces taper with the diameter increasing toward the outside or away from the bearing. The tapered surface opposite the tapered surface of the sealing ring for supporting annular ring 12 is preferably a part of the bearing retaining ring or a part of a bushing fitted over the shaft although it is possible for this tapered surface to be a part of the shaft itself or a part of the bearing housing depending upon whether or not it rotates with the shaft. It is much easier, however, to prepare a separate retaining ring having the tapered surface.

In some embodiments, it may be advisable to provide the sealing ring 9, the retaining ring 7 and/or the annular ring 12 with a surface capable of increasing the friction between the parts. For example, it might be advisable to roughen the surface of at least one of these parts. In this way, locking of the parts of the seal together is assured and the various parts of the assembly will not become separated and fall out of the housing under vibration caused by rotation of the shaft or other parts of the apparatus.

As indicated in FIGURE 3, the various parts of the embodiment of FIGURE 1 are located together against undesirable rotation by providing a catch or projection of one part which meshes or mates with a slot of the other part. Preferably, the catch is on the retaining ring and the slot is on the sealing ring.

If desired, the sealing ring 9 may be made from a plastic material, such as a rubber-like plastic, including a hard rubber-like polyurethane. Moreover, it may be made from any other suitable material, such as, for example, a metal or a combination of a semirigid material, such as metal with a highly resilient rubber or plastic, such as a rubber-like polyurethane. The sealing ring 9 may be formed from sintered metal, hard rubber or steel provided a proper surface finish is obtained which enables sealing of the sealing ring against the bearing race. Any suitable metal, such as mild steel, may be used for forming the other parts of the assembly.

In the embodiment where the sealing ring 9 is arranged on the outside of the bearing and is made of a comparatively soft material, the sealing ring 9 is preferably enclosed in a thin metal casing which not only reinforces the sealing ring but also creates a sharp edge near the opening of the housing which keeps coarse and solid dirt particles from contacting the more sensitive resilient part. Any suitable metal, such as steel or aluminum, may be used.

It may be advantageous in some embodiments to provide a separate sealing disk between the sealing ring and the bearing race which because of its small volume may be formed from a relatively expensive and particularly desirable metal or other material if a better seal is obtained in this way. This intermediate disk is preferably fastened to the sealing ring.

Although certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A shaft seal comprising a ball bearing positioned in a housing and adapted to fit about a shaft, said bearing having an inner race and outer race, and means for securing said bearing in said housing comprising a sealing ring having a surface pressed into sealing relationship with one of said bearing races, said sealing ring having an area which increases in cross-section as it extends inwardly into said housing, a retaining ring having a surface lying against the other bearing race and having an area of decreasing cross-section as it extends inwardly into said housing, said retaining ring and said sealing ring having tapered facing surfaces, and a resilient polyurethane plastic ring having a Shore A hardness of from about 60 to about 90 and a resiliency of from about 35% to about 55% compressed between the said tapered surfaces.

2. In combination, a shaft, a bearing having an inner race and an outer race and being positioned in a housing and about said shaft, and means for securing said bearing within said housing and for forming a seal comprising, a sealing ring lying in sealing relationship with one bearing race, said sealing ring having an area which increases in cross-section as it extends inwardly into said housing, a retaining ring in said housing and having a surface lying against the other bearing race, said retaining ring decreasing in cross-section as it extends inwardly into said housing and having a tapered surface facing said sealing ring, said sealing ring having a tapered surface facing said retaining ring, and a resilient polyurethane plastic ring having a Shore A hardness of from about 60 to about 90 and a resiliency of from about 35% to about 55% compressed between the two tapered surfaces.

3. In combination, a shaft, a bearing positioned in said housing about said shaft and having an inner race and an outer race, a sealing ring about the shaft and pressed into sealing relationship with the inner bearing race, a retaining ring pressed against the outer bearing race having one surface lying against the inner wall of said housing and an opposite tapered surface, means on said housing for holding said retaining ring against said bearing race, said sealing ring having a tapered surface facing the tapered surface of said retaining ring, and a resilient polyurethane plastic ring having a Shore A hardness of from about 60 to about 90 and a resiliency of from about 35% to about 55% compressed between said tapered surfaces.

4. In combination, a shaft, a bearing positioned in a housing about said shaft and having an inner race and an outer race, a sealing ring having an inner tapered surface, positioned about the shaft and pressed into sealing relationship with the outer bearing race, a retaining ring having an outer tapered surface, positioned about the shaft and pressed against the inner bearing race, and a resilient polyurethane plastic ring having a resiliency of from about 35% to about 55% compressed between said tapered surfaces of said sealing ring and retaining ring.

5. The seal of claim 3 wherein said retaining ring and said sealing ring are locked together.

6. A shaft seal comprising a ball bearing positioned in a housing and adapted to fit about a shaft, said bearing having an inner race and outer race, and means for securing said bearing in said housing comprising a hard rubber-like sealing ring having a surface pressed into sealing relationship with one of said bearing races, said sealing ring having an area which increases in cross-section as it extends inwardly into said housing, a retaining ring having a surface lying against the other bearing race and having an area of decreasing cross-section as it extends inwardly into said housing, said retaining ring and said sealing ring having tapered facing surfaces, and a resilient polyurethane plastic ring having a Shore A hardness of from about 60 to about 90 and a resiliency of from about 35% to about 55% compressed between the said tapered surfaces.

7. A shaft seal comprising a bearing positioned in a housing and adapted to fit about a shaft, said bearing having an inner race and an outer race and means for securing said bearing in said housing comprising a sealing ring, said sealing ring having one surface pressed into sealing relationship with one of said bearing races, a second surface lying in a plane substantially perpendicular to the first said surface, a third surface opposite said second surface, said third surface joining the first said surface through a rounded recess, said third surface tapering from said recess towards the said second surface and also towards a fourth surface which is substantially parallel with the first said surface, whereby the cross-section of said ring increases between the fourth said surface and said rounded recess, a retaining ring having one surface lying against the other bearing race and having a tapered surface opposite the tapered surface of the sealing ring and substantially parallel thereto, a surface opposite said surface lying against the bearing race and of greater cross-section, and a resilient ring being compressed between the two tapered surfaces.

8. The seal of claim 7 wherein said sealing ring and said resilient ring are a rubber-like polyurethane plastic.

References Cited in the file of this patent

UNITED STATES PATENTS

| | | |
|---|---|---|
| 2,189,685 | Stevenson | Feb. 6, 1940 |
| 2,431,921 | Cook | Dec. 2, 1947 |
| 2,512,148 | Gaines | June 20, 1950 |
| 2,527,068 | Murray | Oct. 24, 1950 |
| 2,710,206 | Huber | June 7, 1955 |
| 2,747,948 | Jergens | May 29, 1956 |